(12) United States Patent
Kunkel et al.

(10) Patent No.: US 10,249,328 B2
(45) Date of Patent: Apr. 2, 2019

(54) WRITE COIL COOLING ARRANGEMENT AT AIR BEARING SURFACE

(71) Applicant: Seagate Technology LLC, Cupertino, CA (US)

(72) Inventors: Gary Joseph Kunkel, Minneapolis, MN (US); Raul Horacio Andruet, Woodbury, MN (US); James Gary Wessel, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 56 days.

(21) Appl. No.: 15/001,475

(22) Filed: Jan. 20, 2016

(65) Prior Publication Data

US 2017/0206917 A1 Jul. 20, 2017

(51) Int. Cl.
| | |
|---|---|
| *G11B 5/17* | (2006.01) |
| *G11B 5/31* | (2006.01) |
| *G11B 5/40* | (2006.01) |
| *G11B 5/187* | (2006.01) |
| *G11B 5/00* | (2006.01) |
| *G11B 5/012* | (2006.01) |

(52) U.S. Cl.
CPC ............. *G11B 5/17* (2013.01); *G11B 5/187* (2013.01); *G11B 5/3106* (2013.01); *G11B 5/3123* (2013.01); *G11B 5/3133* (2013.01); *G11B 5/3136* (2013.01); *G11B 5/40* (2013.01); *G11B 5/012* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,760,191 B1 | 7/2004 | Yan et al. | |
| 7,362,542 B2 | 4/2008 | Baer et al. | |
| 8,031,432 B2 | 10/2011 | Hsiao et al. | |
| 2003/0026174 A1* | 2/2003 | Yoshikawa | G11B 5/127 369/13.23 |
| 2005/0174685 A1* | 8/2005 | Sasaki | G11B 5/147 360/125.75 |
| 2009/0034121 A1* | 2/2009 | Ohta | G11B 5/3123 360/125.02 |
| 2009/0154011 A1 | 6/2009 | Hsiao et al. | |

* cited by examiner

*Primary Examiner* — Brian M Butcher
(74) *Attorney, Agent, or Firm* — Hollingsworth Davis, LLC

(57) ABSTRACT

A slider comprises an air bearing surface (ABS) and is configured to interact with a magnetic recording medium. A writer is provided on the slider and comprises a write coil having a media-facing surface situated at the ABS. Cooling arms project laterally from peripheral surfaces of the write coil and extend along the ABS. The media-facing surface of the write coil and the cooling arms are exposed to the ABS to facilitate increased cooling of the write coil at the ABS.

15 Claims, 10 Drawing Sheets

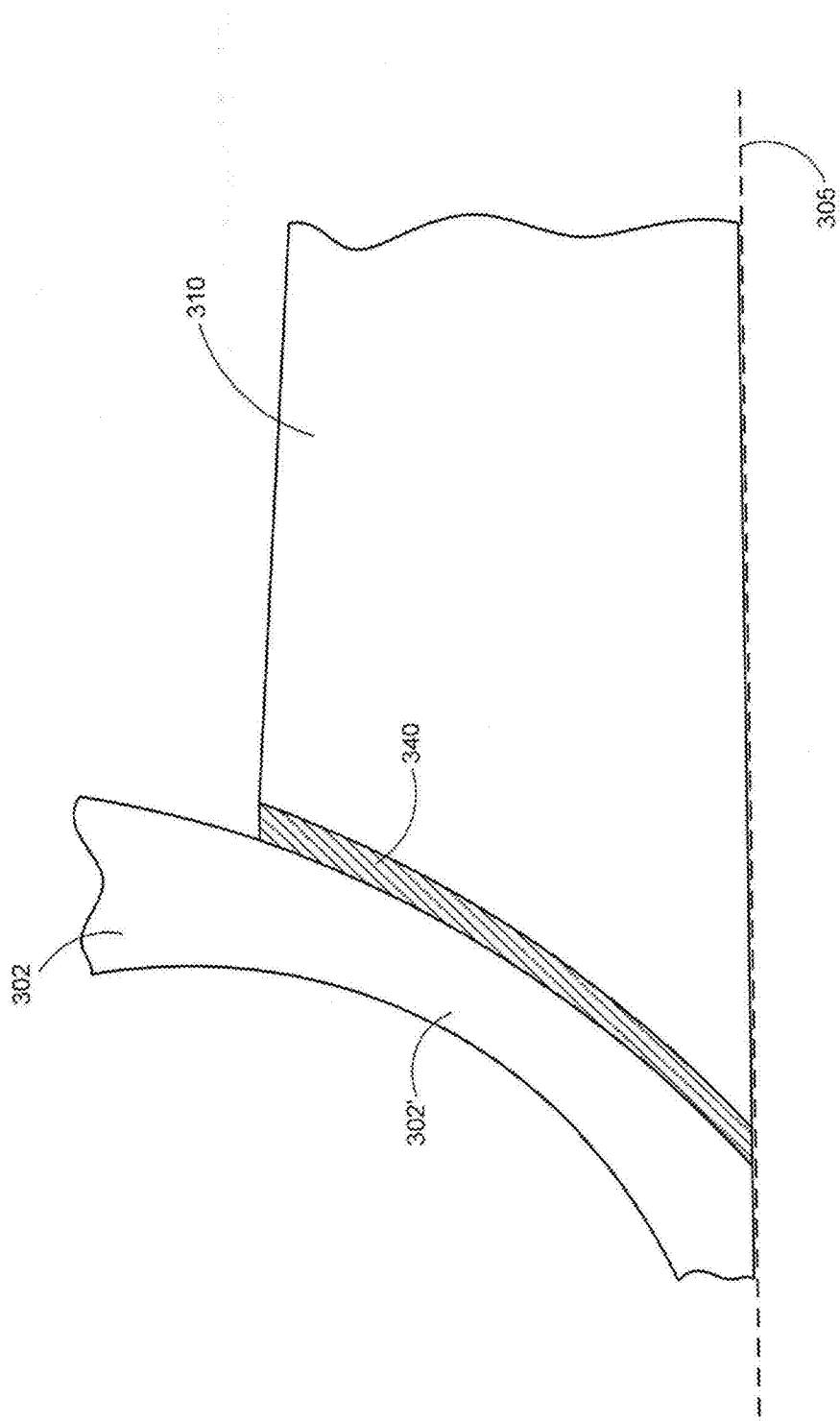

WRITE COIL COOLING ARRANGEMENT AT AIR BEARING SURFACE

SUMMARY

Embodiments of the disclosure are directed to an apparatus comprising a slider having an air bearing surface (ABS) and configured to interact with a magnetic recording medium. A writer is provided on the slider and comprises a write coil having a media-facing surface situated at the ABS. Cooling arms project laterally from peripheral surfaces of the write coil and extend along the ABS. The media-facing surface of the write coil and the cooling arms are exposed to the ABS to facilitate cooling of the write coil at the ABS.

Some embodiments are directed to an apparatus comprising a slider having an ABS and configured to interact with a magnetic recording medium. A writer is provided on the slider and comprises a write pole terminating at or near the ABS, a return pole proximate the write pole, and a write coil arrangement having a media-facing surface situated at the ABS. The write coil arrangement comprise lower and upper write coils each having a generally circularly-shaped periphery, a first peripheral surface, a second peripheral surface, and a width defined between the first and second peripheral surfaces. The write coil arrangement also comprises cooling arms projecting laterally from the first and second peripheral surfaces of the lower and upper write coils and extending along the ABS. The media-facing surface of the write coil arrangement and the cooling arms are exposed to the ABS to facilitate cooling of the write coil arrangement at the ABS.

Other embodiments are directed to an apparatus comprising a slider having an ABS and configured to interact with a magnetic recording medium. A writer is provided on the slider and comprises a write pole terminating at or near the ABS, a return pole proximate the write pole, and a write coil having a media-facing surface situated at the ABS. The media-facing surface of the write coil is exposed to the ABS to facilitate cooling of the write coil at the ABS.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 19 illustrates a writer coil arrangement which incorporates a thermally conductive dielectric material disposed between a write coil and a cooling arm in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to writers of a magnetic recording head and, more particularly, to arrangements for dissipating heat generated by writers during write operations. Embodiments of the disclosure provide for a reduction in Writer-Induced-Writer Protrusion (WIWP) over conventional writer designs due to provision of a write coil cooling arrangement configured to dissipate heat at the air bearing surface of the head. Writer cooling embodiments of the disclosure find particular application in recording heads configured for heat-assisted magnetic recording (HAMR), also referred to as energy-assisted magnetic recording (EAMR), thermally-assisted magnetic recording (TAMR), and thermally-assisted recording (TAR). Embodiments of the disclosure can be implemented in conventional or HAMR heads.

Figure 1:
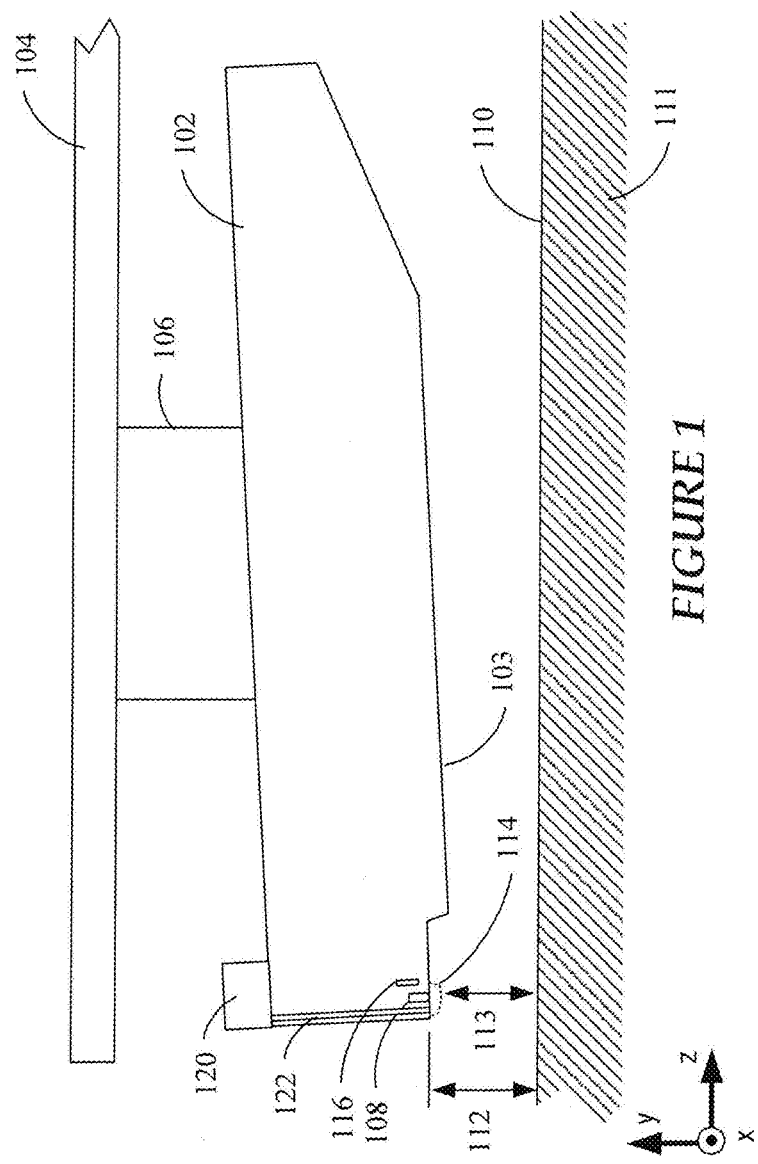
FIG. 1 is a schematic representation of a slider configured for heat-assisted magnetic recording (HAMR) in which the various embodiments disclosed herein may be implemented.

Referring now to FIG. 1, a block diagram shows a side view of a recording head arrangement comprising a slider 102 according to a representative embodiment. The slider 102 may be used in a magnetic data storage device, e.g., a hard disk drive. The slider 102 may also be referred to herein as a recording head, a write head, or a read/write head. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 is configured as a HAMR recording head, which includes a laser 120 (or other energy source) and a waveguide 122. The waveguide 122 delivers light from the laser 120 to components near the read/write transducers 108.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write transducers 108 and the magnetic recording medium 111, and generally defines the head-to-medium spacing 113. To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116.

Figure 2:
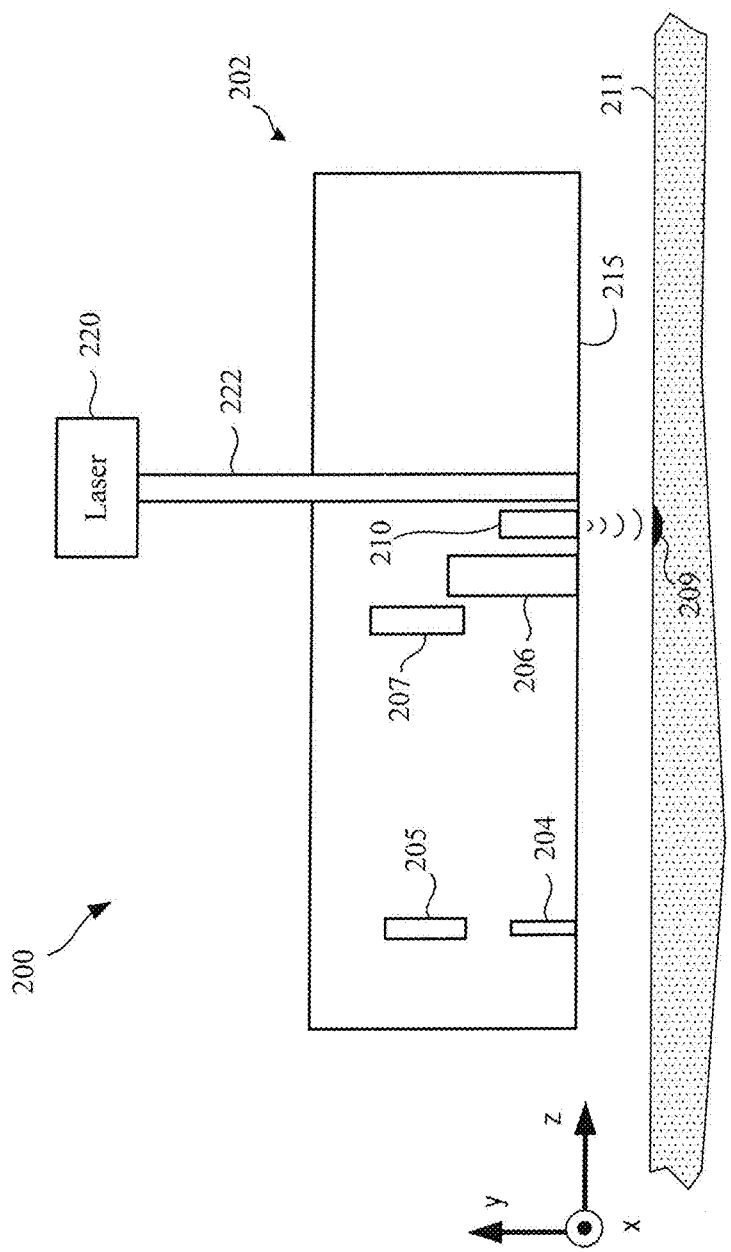
FIG. 2 shows a HAMR slider in accordance with various embodiments.

FIG. 2 shows a recording head arrangement 200 configured for heat-assisted magnetic recording in accordance with various embodiments. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent an NFT 210 which is optically coupled to a light source 220 (e.g., laser diode) via a waveguide 222. The light source 220 can be mounted externally, or integral, to the slider 202. The light source 220 energizes the NFT 210 via the waveguide 222.

A HAMR device utilizes the types of optical devices described above to heat a magnetic recording media (e.g., hard disk) in order to overcome superparamagnetic effects that limit the areal data density of typical magnetic media. When writing with a HAMR device, electromagnetic energy is concentrated onto a small hot spot 209 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 209 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot 209 on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 209. At resonance, a high electric field surrounds the NFT 210 due to the collective oscillations of electrons at the metal surface (e.g., substrate) of the magnetic medium 211. At least a portion of the electric field surrounding the NFT 210 gets absorbed by the magnetic medium 211, thereby raising the temperature of the spot 209 on the medium 211 as data is being recorded.

As was discussed previously, heat produced by a write coil of a writer causes thermal expansion of the slider at and proximate the writer, resulting in WIWP. WIWP must generally be accounted for when the write coil(s) are active in order to maintain a desired head-medium spacing during write operations. In the case of heat-assisted magnetic recording, excitation of the NFT 210 generates appreciable heat, which contributes to thermal expansion of the slider at and proximate to the NFT 210 (e.g., Laser-Induced-Writer-Protrusion or LIWP). Because the NFT 210 is either adjacent or connected to the writer 206 (e.g., via a heat sink in contact with a write pole of the writer 206), cooling of the writer 206 using a writer cooling arrangement of the present disclosure advantageously results in cooling of the NFT 210 (and a reduction of LIWP).

Figure 3:
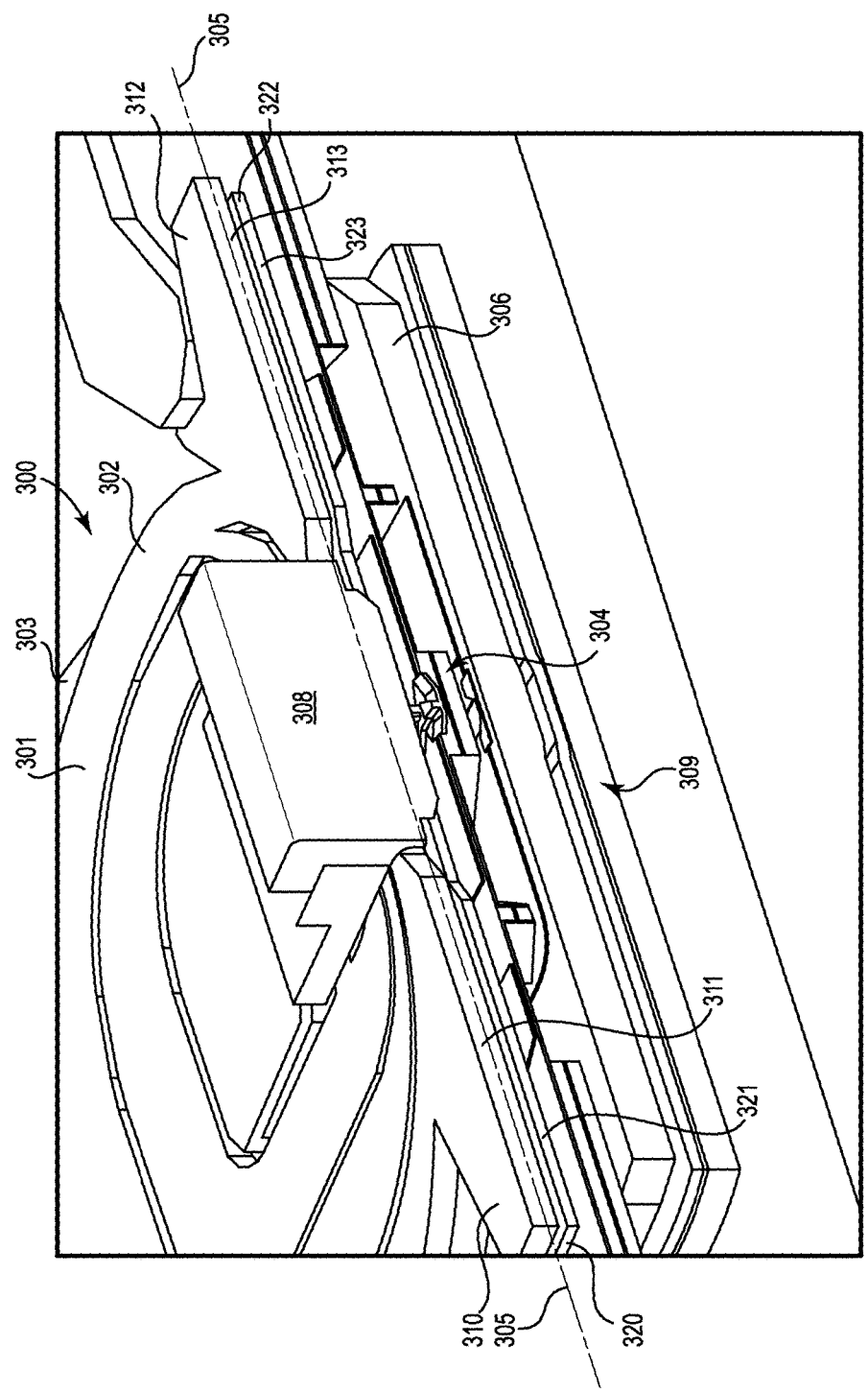
FIG. 3 illustrates a writer which incorporates a write coil cooling arrangement in accordance with various embodiments.

FIG. 3 illustrates a writer 300 which incorporates a write coil cooling arrangement in accordance with various embodiments. The writer 300 shown in FIG. 3 includes a write coil arrangement 301, a first return pole 306, and a second return pole 308. A write pole 304 is disposed between the first return pole 306 and the second return pole 308. A reader arrangement 309 is shown proximate the first return pole 306. The reader arrangement 309 includes a reader element disposed between a pair of reader shields.

In the embodiment shown in FIG. 3, the write coil arrangement 301 includes an upper write coil 302 and a lower write coil 303 positioned below the upper write coil 302. As shown, the coil arrangement 301 is of a double-layer pancake design. It is understood that cooling arrangements of the present disclosure can be implemented for cooling write coil arrangements having a single-layer pancake design or a helical design, for example. The upper and lower write coils 302 and 303 each have a generally circularly-shaped periphery and a width defined between the first and second peripheral surfaces.

As is shown in the embodiment of FIG. 3, the upper write coil 302 includes a pair of cooling arms 310 and 312 that project laterally from peripheral surfaces of the upper write coil 302 and extend along the ABS 305 of the slider. A first cooling arm 310 projects from a peripheral surface of the upper write coil 302 in a first cross-track direction of the slider, and a second cooling arm 312 projects from a peripheral surface of the upper write coil 302 in a second cross-track direction (opposite that of the first cross-track direction). The first cooling arm 310 includes a media-facing surface 311 and the second cooling arm 312 includes a media-facing surface 313. The media-facing surfaces 311 and 313 of the first and second cooling arms 310 and 312 are situated at and extend along the ABS 305 of the slider.

The lower write coil 303 includes a pair of cooling arms 320 and 322 that project laterally from peripheral surfaces of the lower write coil 303 and extend along the ABS 305 of the slider. The first cooling arm 320 projects from a peripheral surface of the lower write coil 303 in the first cross-track direction of the slider, and the second cooling arm 322 projects from a peripheral surface of the lower write coil 302 in the second cross-track direction. The first cooling arm 320 includes a media-facing surface 321 and the second cooling arm 322 includes a media-facing surface 323. The media-facing surfaces 321 and 323 of the first and second cooling arms 320 and 322 are situated at and extend along the ABS 305 of the slider. In the embodiment shown in FIG. 3, the cooling arms 310, 312, 320, and 322 extend beyond peripheral edge surfaces of the respective upper and lower write coils 302 and 303.

In conventional writer designs, the writer coils are recessed into the body of the slider and are not exposed to the ABS. Conventional writer designs can employ cooling arrangements that dissipate heat into the body of the slider. A write coil cooling arrangement of the present disclosure advantageously exposes the writer coil to the ABS of the slider, which is the most significant path to transfer heat out of the slider. For example, the increased air pressure at the ABS provides appreciable cooling of the writer coil, which is a heat transfer path that is more resistive in conventional writer designs.

Figure 4:
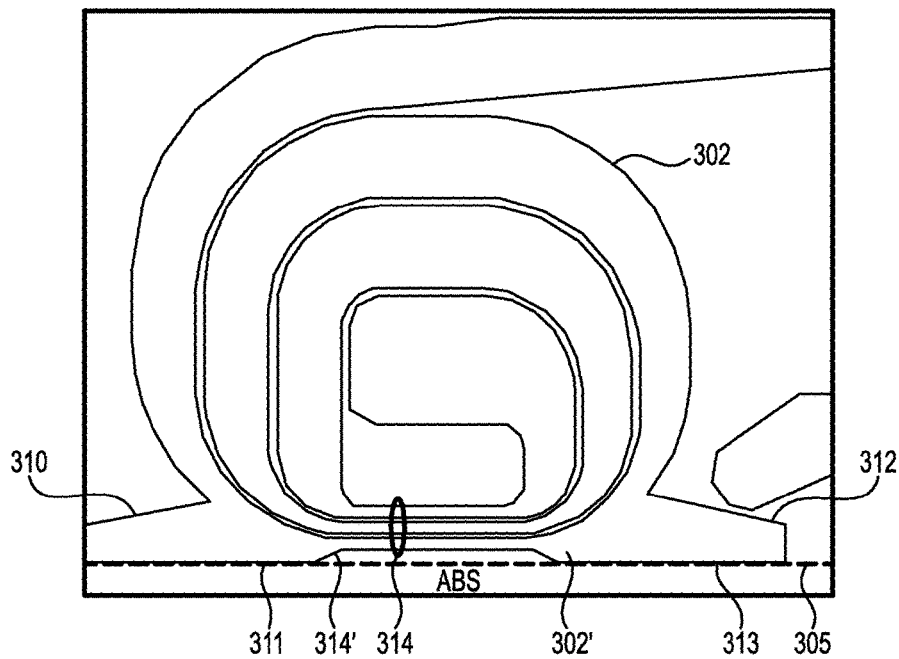
FIG. 4 illustrates a writer which incorporates a write coil cooling arrangement in accordance with some embodiments.
Figure 5:
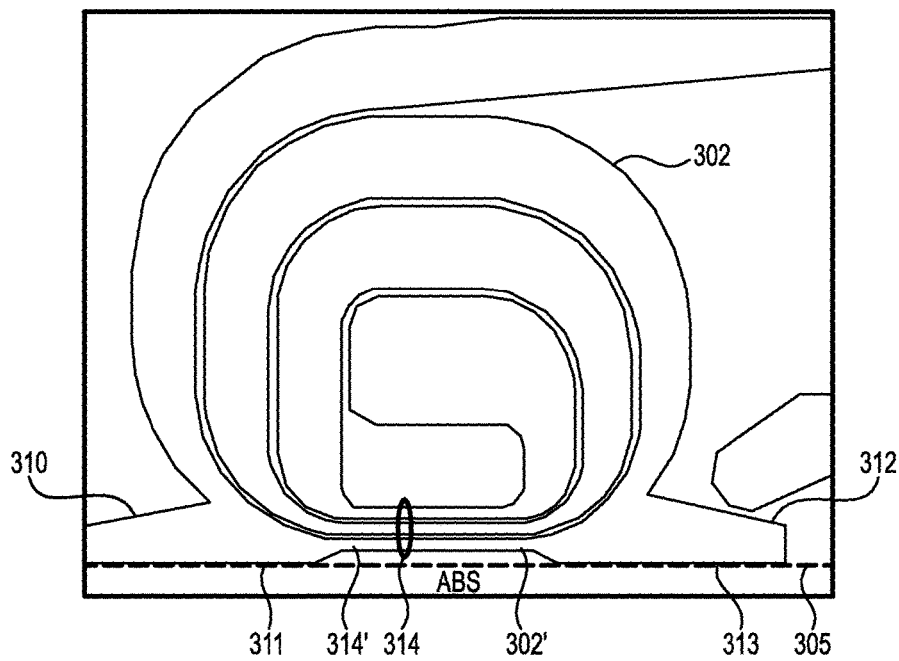
FIG. 5 illustrates a writer which incorporates a write coil cooling arrangement in accordance with other embodiments.

FIG. 4 is a view of an upper write coil 302 incorporating a cooling arrangement in accordance with various embodiments. The upper write coil 302 includes a number of coil turns (e.g., 3 turns), each of which includes a thinned section 314 at or proximate the ABS 305. The thinned sections 314 of the coil turns are locations of the upper write coil 302 where the greatest amount of heat is generated. In the embodiment shown in FIG. 4, and outermost coil turn 302' has a larger thinned section 314' relative to the thinned sections 314 of the inner coil turns. This expanded thinned section 314' extends along the ABS 305 and connects with the cooling arms 310 and 312. It is noted that, according to some embodiments, the thinned section 314' of the outermost coil turn 302' can be of the same size as that of the inner coil turns. For example, and with reference to FIG. 5, the thinned section 314' of the outermost coil turn 302' is of the same size as that of the inner coil turns. In the embodiment shown in FIG. 5, the thinned section 314' of the outermost coil turn 302' is recessed somewhat from the ABS 305 (e.g., by ≤0.5 μm) but still subject to cooling during write operations.

Figure 6:
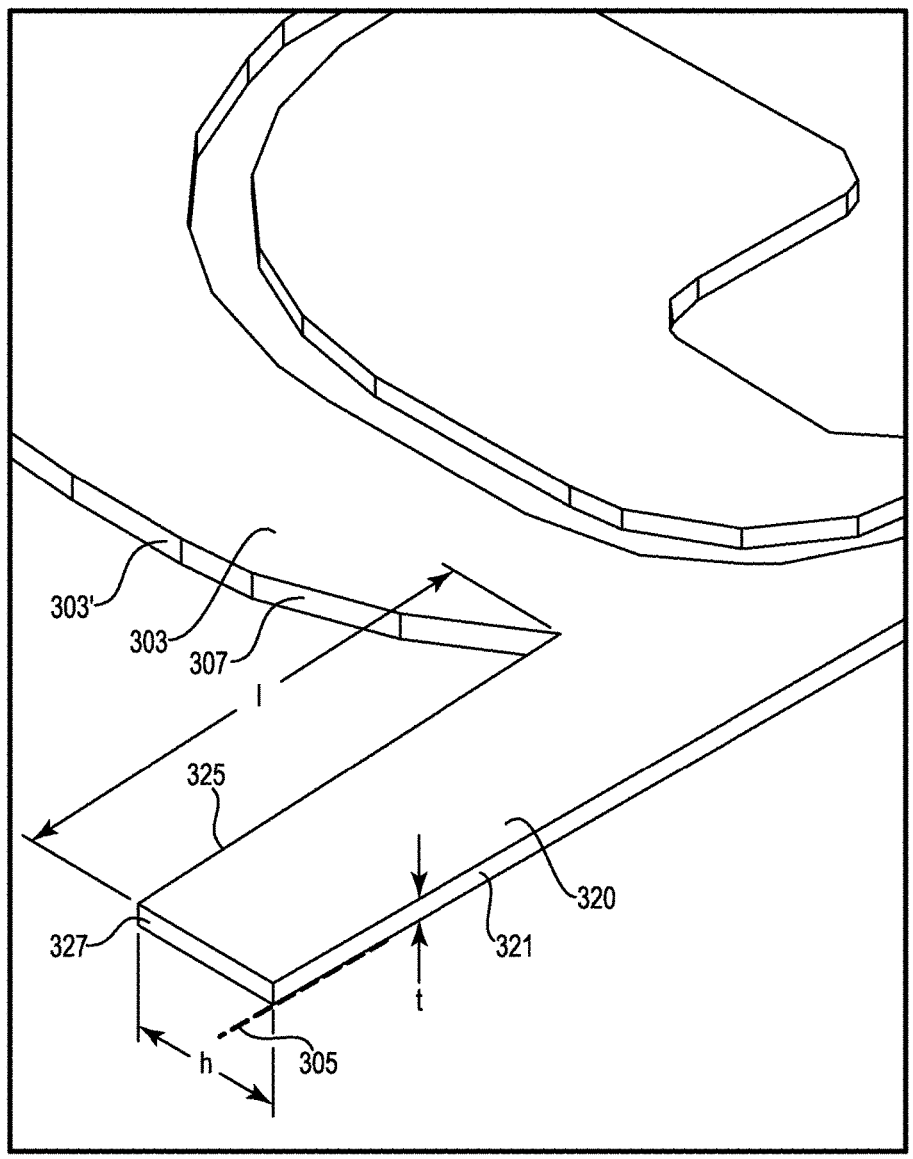
FIG. 6 is an exploded view of a cooling arm of a write coil cooling arrangement in accordance with various embodiments.

FIG. 6 is an exploded view of a cooling arm 320 of a lower write coil 303 in accordance with various embodiments. The cooling arm 320 shown in FIG. 6 has a length, l, a height, h, and a thickness, t. The length, l, is a distance in a cross-track direction defined between a peripheral surface 307 of an outermost turn 303' of the write coil 303 and a terminal end surface 327 of the cooling arm 320. The length, l, of the cooling arm 320 can range between about 10 and 50 μm (e.g., between about 40 and 50 μm). The height, h, is the distance defined between a media-facing surface 321 of the cooling arm 320 and a non-media-facing surface 325. The height, h, of the cooling arm 320 can range between about 3 and 10 μm. The thickness, t, of the cooling arm 320 can be the same as that of other portions of the lower write coil 303 or can be of a different thickness. For example, the thickness, t, of the cooling arm 320 can range between about 0.5 and 10 μm.

It is noted that, although not shown in FIG. 6, a second cooling arm of the lower write coil 303 (e.g., arm 322 shown in FIGS. 7 and 8) typically has length and height dimensions (l, h) different from those of the cooling arm 320 shown in FIG. 6. The dimensions of the cooling arms of the upper write coil (see arms 310 and 312 of coil 302 in FIGS. 4 and 5) can be within the same range as those specified for the lower write coil 303 described with reference to FIG. 6.

According to some embodiments, the lower write coil 303 can have a thickness of about 600 nm. The cooling arms 320 and 322 (see FIGS. 7 and 8) may be formed at the same time as the lower write coil 303. As such, the cooling arms 320 and 322 can have a thickness, t, of about 600 nm (e.g., same thickness as the lower write coil 303). In some embodiments, the upper write coil 302 (see, e.g., FIGS. 4 and 5) has a thickness greater than that of the lower write coil 303, such as about 1 μm. The cooling arms 310 and 312 (see FIGS. 9 and 10) may be formed at the same time as the upper write coil 302. As such, the cooling arms 310 and 312 can have a thickness, t, of about 1 μm or greater (e.g., same thickness as the upper write coil 302). It is noted that length, l, and height, h, dimensions may be unique to each cooling arm of the upper and lower write coils 302 and 303. It is further noted that, according to some embodiments discussed below, the cooling arms 310, 312, 320, and 322 can have a thickness, t, greater than that of their respective upper and lower write coils 302 and 303.

Figure 7:
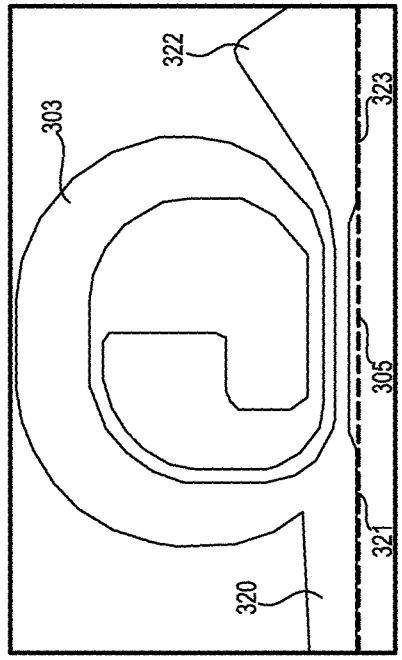
FIGS. 7 and 8 are views of a lower write coil that incorporates a cooling arrangement in accordance with various embodiments.
Figure 9:
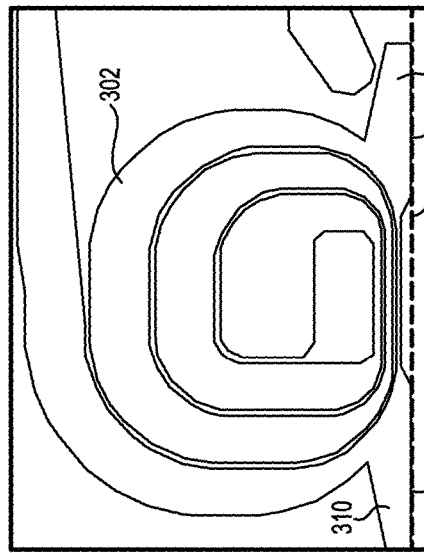
FIGS. 9 and 10 are views of an upper write coil that incorporates a cooling arrangement in accordance with various embodiments.
Figure 8:
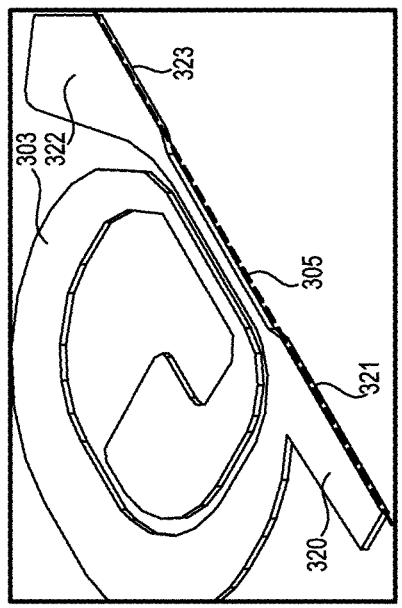
Figure 10:
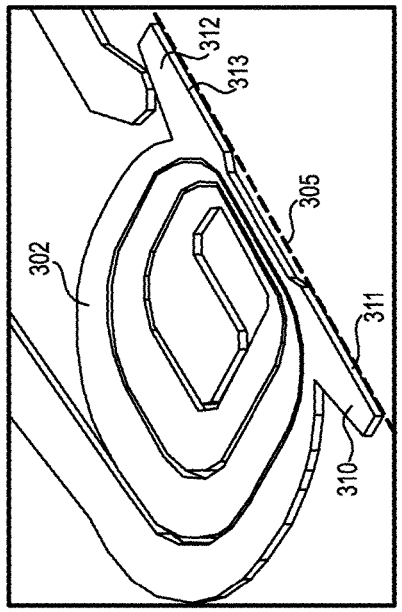

FIGS. 7 and 8 show views of a lower write coil 303 incorporating cooling arms 320 and 322, while FIGS. 9 and 10 show views of an upper write coil 302 incorporating cooling arms 310 and 312 in accordance with various embodiments. In FIGS. 7 and 8, the cooling arm 320 is the same as that shown in the exploded view of the lower write coil 303 illustrated in FIG. 6. The cooling arm 322 has length, l, and height, h, dimensions different from those of cooling arm 320. Each of the cooling arms 320 and 322 has a media-facing surface 321 and 323 situated at and extending along the ABS 305. In a similar manner, cooling arm 310 of the upper write coil 302 shown in FIGS. 9 and 10 has length, l, and height, h, dimensions different from those of cooling arm 312. Each of the cooling arms 310 and 312 has a media-facing surface 311 and 313 situated at and extending along the ABS 305. Notwithstanding the different configurations and dimensions of cooling arms shown in the figures, each cooling arm is configured to dissipate heat generated in a coil of the writer to the ABS 305, such that each cooling arm is subject to increased cooling at the ABS 305.

Figure 11:
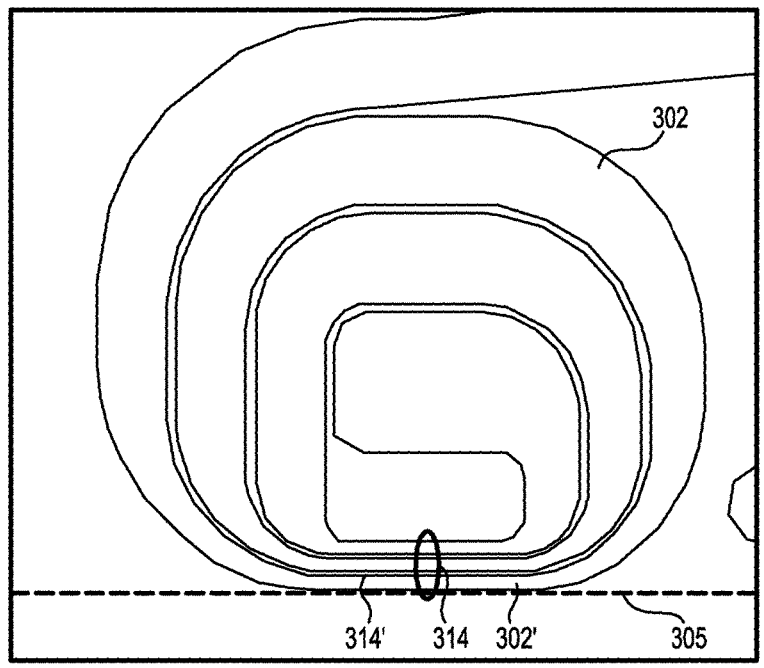
FIG. 11 is a view of a write coil having an outermost coil turn exposed to an ABS of the slider in accordance with various embodiments.
Figure 12:
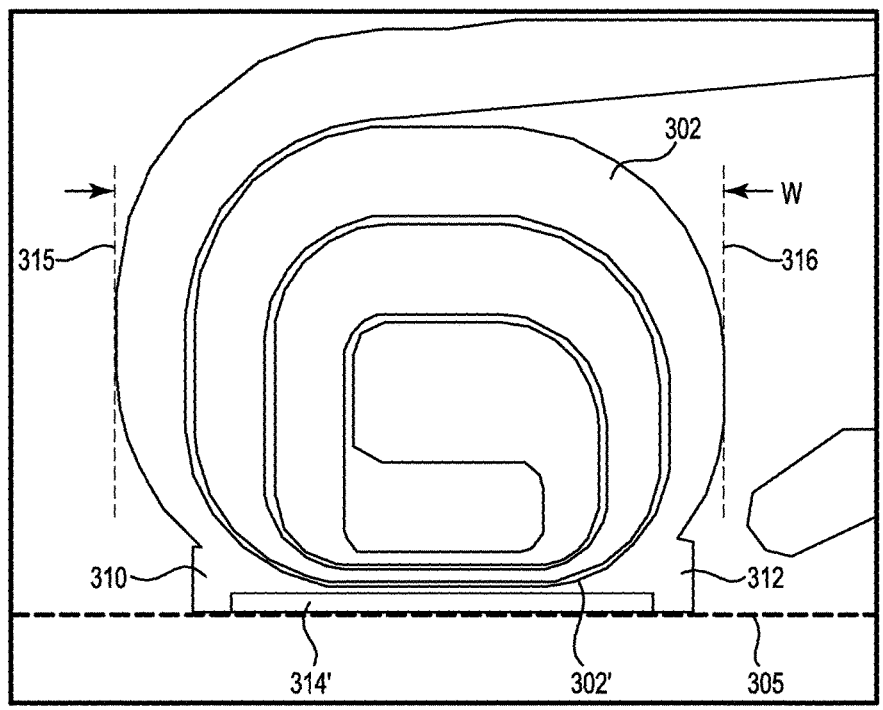
FIG. 12 illustrates a writer which incorporates a truncated write coil cooling arrangement in accordance with some embodiments.

FIGS. 11 and 12 illustrate embodiments of a write coil in accordance with alternative embodiments. FIG. 11 shows a write coil 302 having a media-facing surface situated at and extends along the ABS 305 of the slider. More particularly, the write coil 302 includes a number of turns each having a thinned section 314. The thinned section 314' of the outermost turn 302' is situated at and extends along the ABS 305. Although the write coil 302 shown in FIG. 11 excludes the cooling arms of other embodiments, significant cooling of the write coil 302 is achieved through cooling of the thinned section 314 of the write coil 302 at the ABS 305. As was discussed previously, the thinned section 314 is the portion of the write coil 302 where the greatest amount of heat is generated.

FIG. 12 illustrates a write coil 302 having truncated cooling arms 310 and 312 situated at and extending along the ABS 305 of the slider. In the embodiment of FIG. 12, the truncated cooling arms 310 and 312 serve to increase the surface area of the thinned section 314' of the outermost coil turn 302' that is exposed to the ABS 305 and subjected to increased cooling. In the embodiment shown in FIG. 12, the write coil 302 has a width, w, defined between peripheral edges 316 and 315, and the truncated cooling arms 310 and 312 have a length, l, constrained within the width, w, of the write coil 302.

Figure 14:
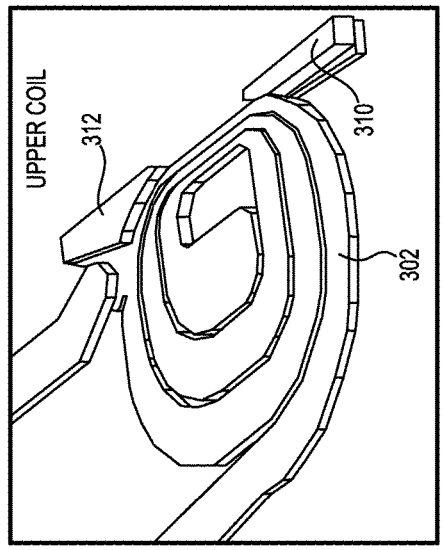
FIGS. 13 and 14 illustrate an upper write coil of a writer that incorporates a thickened cooling arrangement in accordance with some embodiments.
Figure 13:
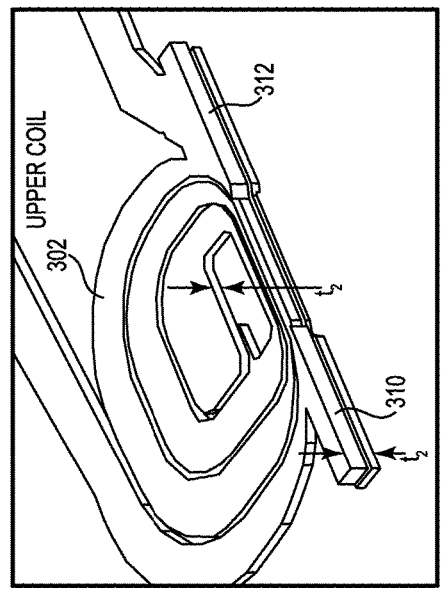
Figure 15:
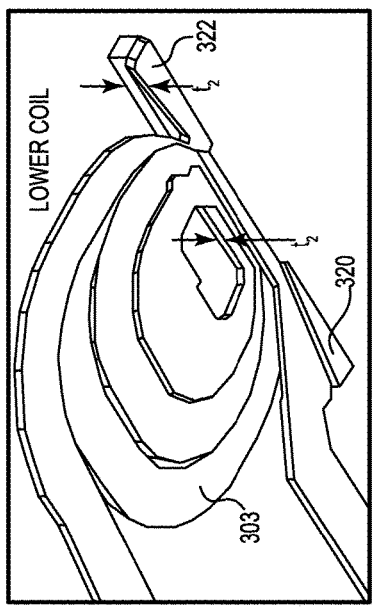
FIG. 15 illustrates a lower write coil of a writer that incorporates a thickened cooling arrangement in accordance with some embodiments.

FIGS. 13 and 14 illustrate an upper write coil 302 of a writer that incorporates thickened cooling arms 310 and 312 in accordance with various embodiments. FIG. 15 shows a lower write coil 303 that incorporates thickened cooling arms 320 and 322 in accordance with various embodiments. As is shown in FIGS. 13 and 15, each of the cooling arms 310, 312, 320, and 322 has a thickness, $t_1$. As is also shown in FIGS. 13 and 15, each of the upper and lower write coils 302 and 303 has a thickness, $t_2$. As was discussed previously, the upper write coil 302 has a thickness, $t_2$, of about 1 µm, and the lower write coil 303 has a thickness, $t_2$, of about 600 nm. The thickness, $t_1$, of the cooling arms 310, 312, 320, and 322 can range between about 1.5 to 4 times the respective thickness, $t_2$, of the upper and lower write coils 302 and 303. For example, the thickness, $t_1$, can range between about 1.5 µm and 4 µm (e.g., between about 2-3 µm). It is noted that the thickness, $t_1$, of the cooling arms 310, 312, 320, and 322 is typically related to the thickness, $t_2$, of the upper and lower write coil 302 and 303.

Figure 17:
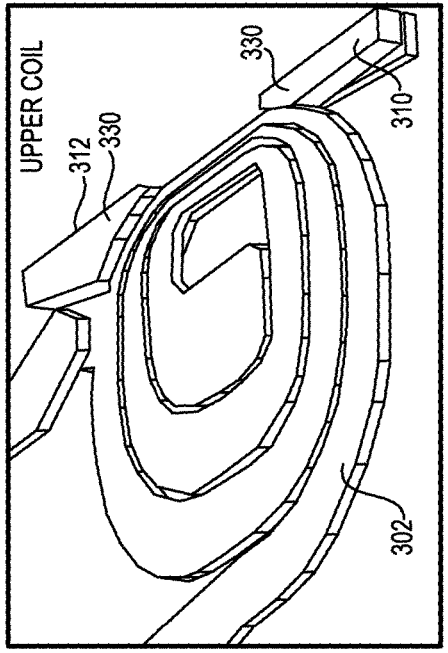
FIGS. 16 and 17 illustrate an upper write coil of a writer that incorporates a thickened cooling arrangement coated with a ABS-friendly metal or metal alloy in accordance with some embodiments.
Figure 16:
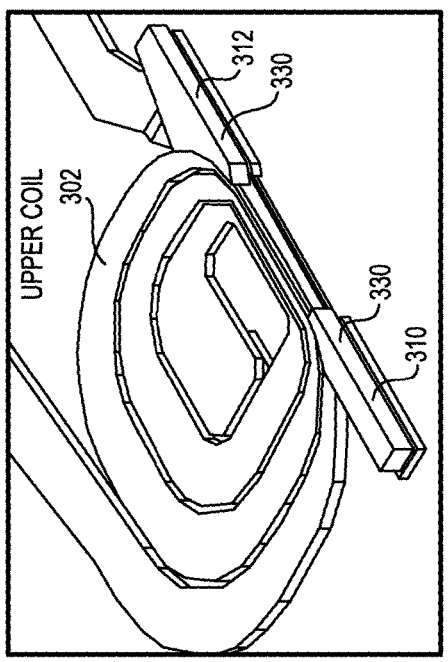
Figure 18:
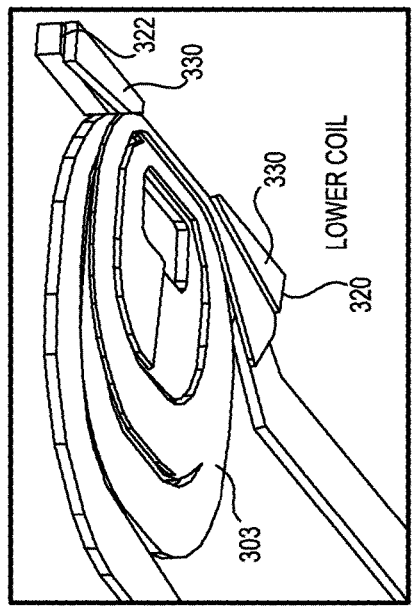
FIG. 18 illustrates a lower write coil of a writer that incorporates a thickened cooling arrangement coated with a ABS-friendly metal or metal alloy in accordance with some embodiments.

FIGS. 16 and 17 illustrate an upper write coil 302 of a writer that incorporates thickened cooling arms 310 and 312 which further include a coating or layer 330 of conductive material that differs from the material used to fabricate the cooling arms 310 and 312 in accordance with various embodiments. FIG. 18 illustrates a lower write coil 303 that incorporates thickened cooling arms 320 and 322 which further include a coating or layer 330 of conductive material that differs from that used to fabricate the cooling arms 320 and 322. In FIGS. 16-18, the cooling arms 310, 312, 320, 322 can have thicknesses described previously with regard to the embodiment shown in FIGS. 13-15. In addition, the cooling arms 310, 312, 320, and 322 can include a coating or layer 330 of an ABS-friendly metal or metal alloy. An ABS-friendly material is one that enhances electrical, mechanical, and/or chemical performance of the write coil within the environment at the ABS. Suitable metals or metal alloys include NiFe and Cr, for example.

Typically, the upper and lower write coils 302 and 303 are formed from copper. Although copper is an exceptional conductor, copper can be subject to corrosion at the ABS over time. Covering the cooling arms 310, 312, 320, and 322 with an ABS-friendly metal or metal alloy 330 prevents or reduces the likelihood of corrosion of the copper coil structure when exposed to the ABS. Moreover, exposing an electrically charged copper coil structure to the ABS can result in development of a large voltage potential between the coil structure and the disk surface. Coating the cooling arms 310, 312, 320, and 322 with an ABS-friendly metal or metal alloy 330 that is less conductive than copper can reduce the voltage potential between the writer coils and the disk surface.

According to some embodiments, the material 330 used to coat or cover the cooling arms 310, 312, 320, and 322 is an electrically insulating and thermally conducting material. In some embodiments, the cooling arms 310, 312, 320, and 322 can be formed from the electrically insulating and thermally conducting material. Suitable thermally conductive dielectric materials include MgO and AlN. Such materials provide good thermal conduction while electrically insulating much of the copper coil structure exposed to the ABS, thereby reducing the voltage potential between the writer coils 302 and 303 and the disk surface.

In other embodiments, the cooling arms 310, 312, 320, and 322 can be electrically insulated from, but thermally coupled to, the write coils 302 and 303. For example, and with reference to FIG. 19, a thermally conductive dielectric material 340 is disposed between the write coil 302 and the cooling arm 310. In particular, the thermally conductive dielectric material 340 (e.g., MgO or AlN) is disposed between the outermost turn 302' of the write coil 302 and the cooling arm 310. In other embodiments, commonly employed dielectric materials, such as alumina or silica, can be used to electrically isolate the cooling arm 310 from the write coil 302. The embodiment shown in FIG. 19 provides for good thermal conduction of heat from the writer coils 302 and 303 to the cooling arms 310, 312, 320, and 322 while electrically isolating the cooling arms 310, 312, 320, and 322 from the writer coils 302 and 303, thereby reducing the voltage potential between the writer coils 302 and 303 and the disk surface.

Numerical modeling was performed to demonstrate the efficacy of a writer cooling arrangement according to an embodiment of the disclosure. The following data shows significant improvement in several performance parameters of a writer that incorporates cooling arms when compared to a conventional writer (i.e., no cooling arms and coils recessed into the body of the slider with no exposure to the ABS). A subset of the modeling results data is provided below in Table 1:

TABLE 1

| Parameter | Baseline Design | Cooling Arms Design | Delta | Ratio |
| --- | --- | --- | --- | --- |
| WIWP | 3.82 nm | 3.26 nm | −0.57 | 0.85 |
| WIWP Slope | 2.31 A/mW | 2.10 A/mW | −0.21 | 0.91 |
| WIRP | 2.24 nm | 1.89 nm | −0.35 | 0.84 |
| Reader Recession to Close point | 1.82 nm | 0.93 nm | −0.89 | 0.51 |

The data of Table 1 demonstrates that the writer with cooling arms design provided a 15% decrease in Writer-Induced-Writer-Protrusion (WIWP) and a 9% reduction in WIWP slope over a conventional (baseline) design. The data also demonstrates that the writer with cooling arms design provided a 16% reduction in Writer-Induced-Reader-Protrusion (WIRP) and a 49% reduction in reader recession to the close point during writer heater operation Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. An apparatus, comprising:
a slider configured to interact with a magnetic recording medium and comprising an air bearing surface (ABS);
a writer provided on the slider and comprising a write coil having a plurality of coil turns, a planar configuration, and a media-facing surface situated at the ABS, each of the turns having a thinned section that extends along the ABS and a thickened section spaced away from the ABS; and
a plurality of cooling arms projecting laterally from peripheral surfaces of the write coil, each of the plurality of cooling arms extending along the ABS;
wherein the media-facing surface of the write coil, including at least the thinned section of an outermost turn of the coil turns, and the cooling arms are exposed in a plane of the ABS to facilitate cooling of the write coil at the ABS.

2. The apparatus of claim 1, wherein the cooling arms have a length of between about 10 and 50 μm.

3. The apparatus of claim 1, wherein the cooling arms have a height of between about 3 and 10 μm.

4. The apparatus of claim 1, wherein the cooling arms have a thickness equal to that of the write coil.

5. The apparatus of claim 1, wherein the cooling arms have a thickness greater than that of the write coil.

6. The apparatus of claim 1, wherein the cooling arms have a thickness of between about 1 and 10 μm.

7. The apparatus of claim 1, wherein write coil and the cooling arms are formed from the same material.

8. The apparatus of claim 1, wherein write coil is formed from a first material, and the cooling arms are formed from a material different from the first material.

9. The apparatus of claim 8, wherein:
the write coil is formed from an electrically conducive metal or alloy; and
the cooling arms are formed from an electrically insulating and thermally conducting material.

10. The apparatus of claim 1, comprising a thermally conductive dielectric material disposed between the write coil and the cooling arms.

11. An apparatus, comprising:
a slider configured to interact with a magnetic recording medium and comprising an air bearing surface (ABS);
a writer provided on the slider and comprising:
a write pole terminating at or near the ABS;
a return pole proximate the write pole; and
a write coil arrangement having a media-facing surface situated at the ABS, the write coil arrangement comprising:
lower and upper write coils each having a planar configuration, a generally circularly-shaped periphery, a first peripheral surface, a second peripheral surface, and a width defined between the first and second peripheral surfaces; and
a plurality of cooling arms projecting laterally from the first and second peripheral surfaces of the lower and upper write coils, each of the plurality of cooling arms extending along the ABS and having a thickness of between about 1 and 10 μm;
wherein the media-facing surface of the write coil arrangement and the cooling arms are exposed in a plane of the ABS to facilitate cooling of the write coil arrangement at the ABS.

12. The apparatus of claim 11, wherein the cooling arms have a length of between about 10 and 50 μm.

13. The apparatus of claim 11, wherein the cooling arms have a height of between about 3 and 10 μm.

14. The apparatus of claim 11, wherein:
the lower and upper write coils are formed from an electrically conductive metal or alloy; and
the cooling arms are formed from an electrically insulating and thermally conducting material.

15. The apparatus of claim 11, comprising a thermally conductive dielectric material disposed between the lower and upper write coils and the cooling arms.

* * * * *